(12) United States Patent
Irie

(10) Patent No.: US 9,164,614 B2
(45) Date of Patent: Oct. 20, 2015

(54) ELECTRONIC DEVICE THAT INVALIDATES TOUCH INPUT WHEN RELATIVE MOVEMENT BETWEEN DISPLAY SCREENS IS DETECTED

(75) Inventor: Kakeru Irie, Daito (JP)

(73) Assignee: KYOCERA Corporation, Kyoto (JP)

( * ) Notice: Subject to any disclaimer, the term of this patent is extended or adjusted under 35 U.S.C. 154(b) by 139 days.

(21) Appl. No.: 13/984,781

(22) PCT Filed: Feb. 8, 2012

(86) PCT No.: PCT/JP2012/052855
§ 371 (c)(1),
(2), (4) Date: Aug. 9, 2013

(87) PCT Pub. No.: WO2012/108462
PCT Pub. Date: Aug. 16, 2012

(65) Prior Publication Data
US 2013/0321339 A1    Dec. 5, 2013

(30) Foreign Application Priority Data
Feb. 10, 2011    (JP) .................................. 2011-027232

(51) Int. Cl.
*G06F 3/045*    (2006.01)
*G06F 3/041*    (2006.01)
(Continued)

(52) U.S. Cl.
CPC ............ *G06F 3/0412* (2013.01); *G06F 1/1643* (2013.01); *G06F 1/1675* (2013.01); *G06F 3/0418* (2013.01); *H04M 1/0241* (2013.01); *H04M 1/0247* (2013.01); *G06F 1/162* (2013.01); *H04M 1/0216* (2013.01);
(Continued)

(58) Field of Classification Search
CPC ....... G06F 3/041; G06F 3/0414; G06F 3/042; G06F 3/0421; G06F 3/044
USPC ................... 345/173–178; 178/18.01–18.07, 178/20.01–20.04
See application file for complete search history.

(56) References Cited

U.S. PATENT DOCUMENTS 7,480,379 B2 *    1/2009    Yoshikawa ............... 379/433.06
8,606,327 B2 *    12/2013    Irie et al. ...................... 455/566
(Continued)

FOREIGN PATENT DOCUMENTS

JP    2005-203930 A    7/2005
JP    2006-270836 A    10/2006
(Continued)

OTHER PUBLICATIONS

International Search Report dated Apr. 24, 2012, issued for International Application No. PCT/JP2012/052855.

*Primary Examiner* — Vijay Shankar
(74) *Attorney, Agent, or Firm* — Procopio, Cory, Hargreaves & Savitch LLP

(57) ABSTRACT

An electronic device includes a plurality of display screens, a joining part configured to join the display screens relatively movably, touch panels provided on the display screens, a touch panel control module configured to receive signals from the touch panels, a movement sensing sensor configured to sense relative movement between the display screens, and a control module to which signals from the touch panel control module are inputted, the control module being configured to invalidate the input of the signals from the touch panel control module, when the relative movement between the display screens is sensed by the movement sensing sensor.

10 Claims, 5 Drawing Sheets

(51) Int. Cl.
*G06F 1/16* (2006.01)
*H04M 1/02* (2006.01)

(52) U.S. Cl.
CPC ...... *H04M 2250/12* (2013.01); *H04M 2250/16* (2013.01); *H04M 2250/22* (2013.01)

(56) References Cited

U.S. PATENT DOCUMENTS

| | | | |
|---|---|---|---|
| 8,612,896 B2 * | 12/2013 | Irie | ............... 715/864 |
| 2005/0180556 A1 | 8/2005 | Satoh | |
| 2009/0005130 A1 | 1/2009 | Ishikura et al. | |
| 2010/0188350 A1 | 7/2010 | Sawada | |
| 2011/0143819 A1 | 6/2011 | Sugiyama et al. | |

FOREIGN PATENT DOCUMENTS

| | | |
|---|---|---|
| JP | 2009-71588 A | 4/2009 |
| JP | 2009-080683 A | 4/2009 |
| JP | 2009-218674 A | 9/2009 |
| JP | 2010-065840 A | 3/2010 |
| JP | 2011-23795 A | 2/2011 |
| WO | 2005/053288 A | 6/2005 |

* cited by examiner (a)

(b)

(c)

ELECTRONIC DEVICE THAT INVALIDATES TOUCH INPUT WHEN RELATIVE MOVEMENT BETWEEN DISPLAY SCREENS IS DETECTED

TECHNICAL FIELD

The present invention relates to an electronic device having a plurality of display screens, and more particularly to an electronic device that can increase operability and can prevent an erroneous operation, malfunction or the like.

BACKGROUND ART

There has been known an electronic device having a display screen capable of displaying information such as characters, an image and the like, and as this type of electronic devices, there are devices each including, on the display screen, a touch panel that a user can operate.

In some of these electronic devices, in order to prevent an erroneous operation, malfunction or the like of the touch panel, a setting range of validity or invalidity on the touch panel is enabled to be determined based on a specification by the user, and an operation of the user enables the touch panel to be invalidated in a range set in advance or set by the user.

However, in the above electronic device, for switching the validity or invalidity of the touch panel, the user needs to perform a switching operation in advance, which may make the user feel inconvenience.

Moreover, in the electronic device having the plurality of display screens, when the display screens are relatively moved to be used, for example, when the display screens are opened/closed or are slid and so on, the user may unintentionally touch the touch panel.

In such a situation, there are many cases where the touch panel is not invalidated by the switching operation of the user in advance, so that there is a possibility that an erroneous operation, malfunction or the like is easily caused.

There has been demanded an electronic device capable of preventing an erroneous operation, malfunction or the like caused by a user touching a touch panel when the user opens/closes or slides display screens.

SUMMARY OF THE INVENTION

An electronic device according to one aspect of the present invention includes:

a plurality of display screens configured to display information;

a joining part configured to join the plurality of display screens relatively movably;

a touch panel provided on at least one of the plurality of display screens, and configured to be operated by a user;

a touch panel control module electrically connected to the touch panel, and configured to receive a signal from the touch panel;

a movement sensing sensor configured to sense relative movement between the display screens; and a control module electrically connected to the touch panel control module and the movement sensing sensor, and a signal from the touch panel control module configured to be inputted to, the control module being configured to invalidate the input of the signal from the touch panel control module, when the relative movement between the display screens is sensed by the movement sensing sensor.

DETAILED DESCRIPTION OF EMBODIMENT

Figure 1:
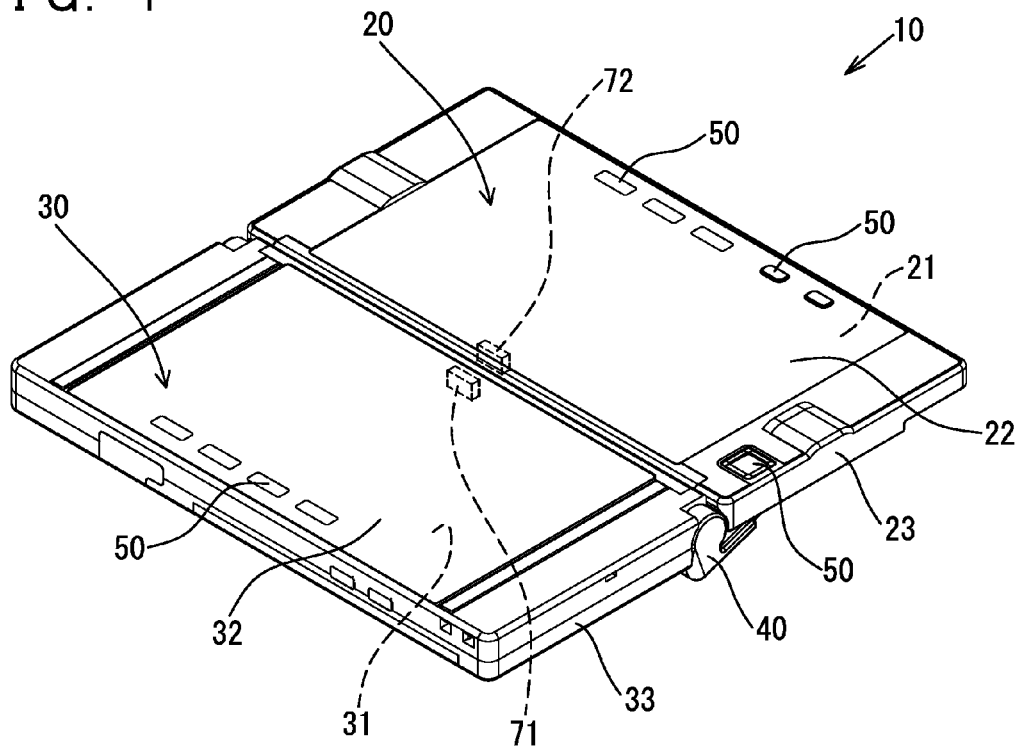
FIG. 1 is a perspective view showing one example of an electronic device to which the present invention is applied, showing a flat approaching state where display screens are located substantially coplanarly and approach each other.

One embodiment of the present invention relates to an electronic device 10 including a plurality of display screens 21, 31, at least one of which includes a touch panel 22 or 32, to increase visibility, operability and the like by a user opening/closing the display screens, sliding the same, and so on.

More specifically, the present invention relates to the electronic device 10 that can prevent a situation in which during relative movement such as a slide motion, a turning motion or the like between the display screens 21, 31, the user touches the touch panels, 22, 32, or grasps the touch panels 22, 32, by which unintentional input by the user is performed, thereby causing an erroneous operation, malfunction or the like.

As an operation that causes the unintentional input by the user when the display screens 21, 31 are mutually slid, an operation of the user pushing the touch panel 22 or 32 in a slide direction with a thumb of one hand or thumbs of both hands can be exemplified. Moreover, as an operation that causes the unintentional input by the user when the display screens 21, 31 are mutually turned, an operation of the user opening or closing the display screens 21, 31 while grasping or holding on the touch panel 22 or 32 with a thumb and four fingers can be exemplified.

When the above operations are performed to the touch panels 22, 32, it is typically recognized as input of drag, flick, pinch, long touch and the like (hereinafter, collectively referred to as "long-push operation").

Hereinafter, while taking a portable electronic device as an example, the electronic device 10 will be described with reference to the drawings, specific structure and configuration of the electronic device described below are for description, and obviously, the present invention should not be limitedly construed.

First, the structure of the portable electronic device 10 according to the present embodiment will be described.

As shown in FIGS. 1 to 6, the electronic device 10 can be configured by joining a plurality of display parts 20, 30 relatively movably by opening/closing, sliding the display parts 20, 30, and so on through a joining part 40, the plurality of display parts 20, 30 having the display screens 21, 31 that can display information such as characters, figures, images, videos and the like, and the touch panels 22, 32 that can be operated by the user touching surfaces of the display screens.

Figure 3:
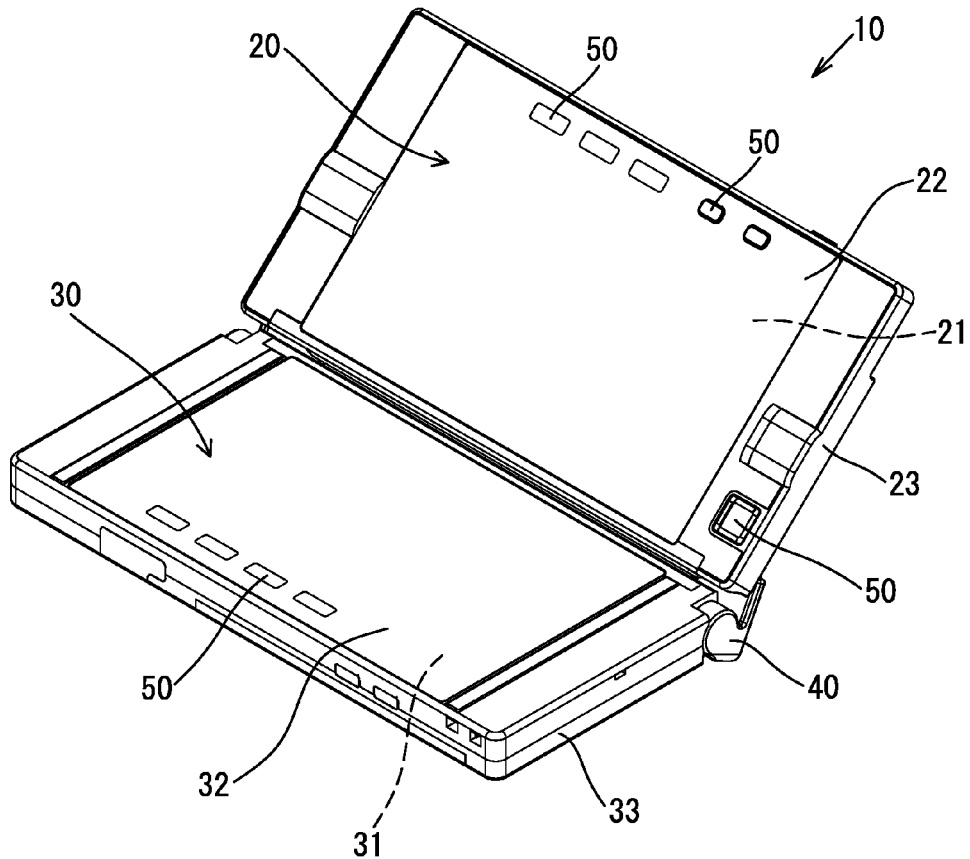
FIG. 3 is a perspective view of the electronic device, showing a tilted state where a first display screen is rotated with respect to a second display screen from the state in FIG. 2, so that the first display screen is tilted with respect to the second display screen.
Figure 4:
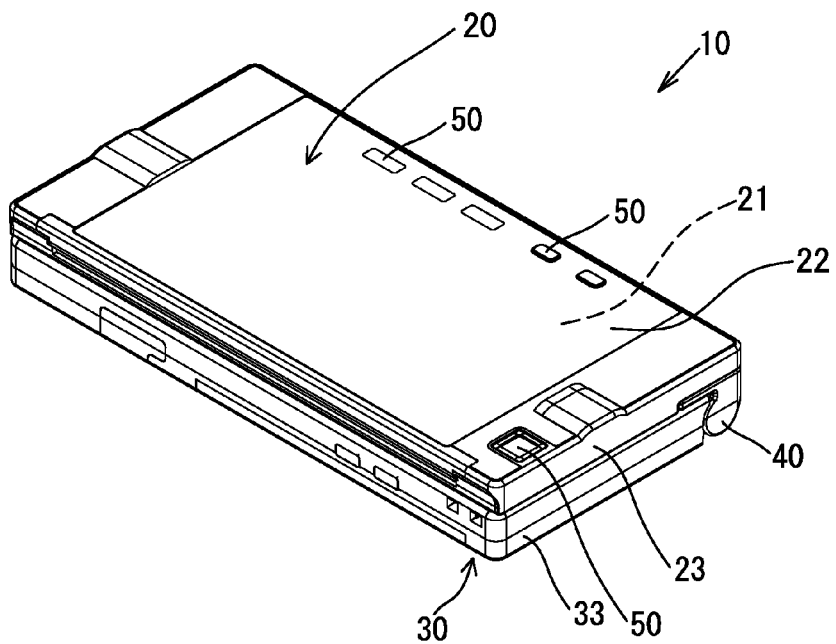
FIG. 4 is a perspective view of the electronic device, showing a folded state where the display screens overlap each other.
Figure 5:
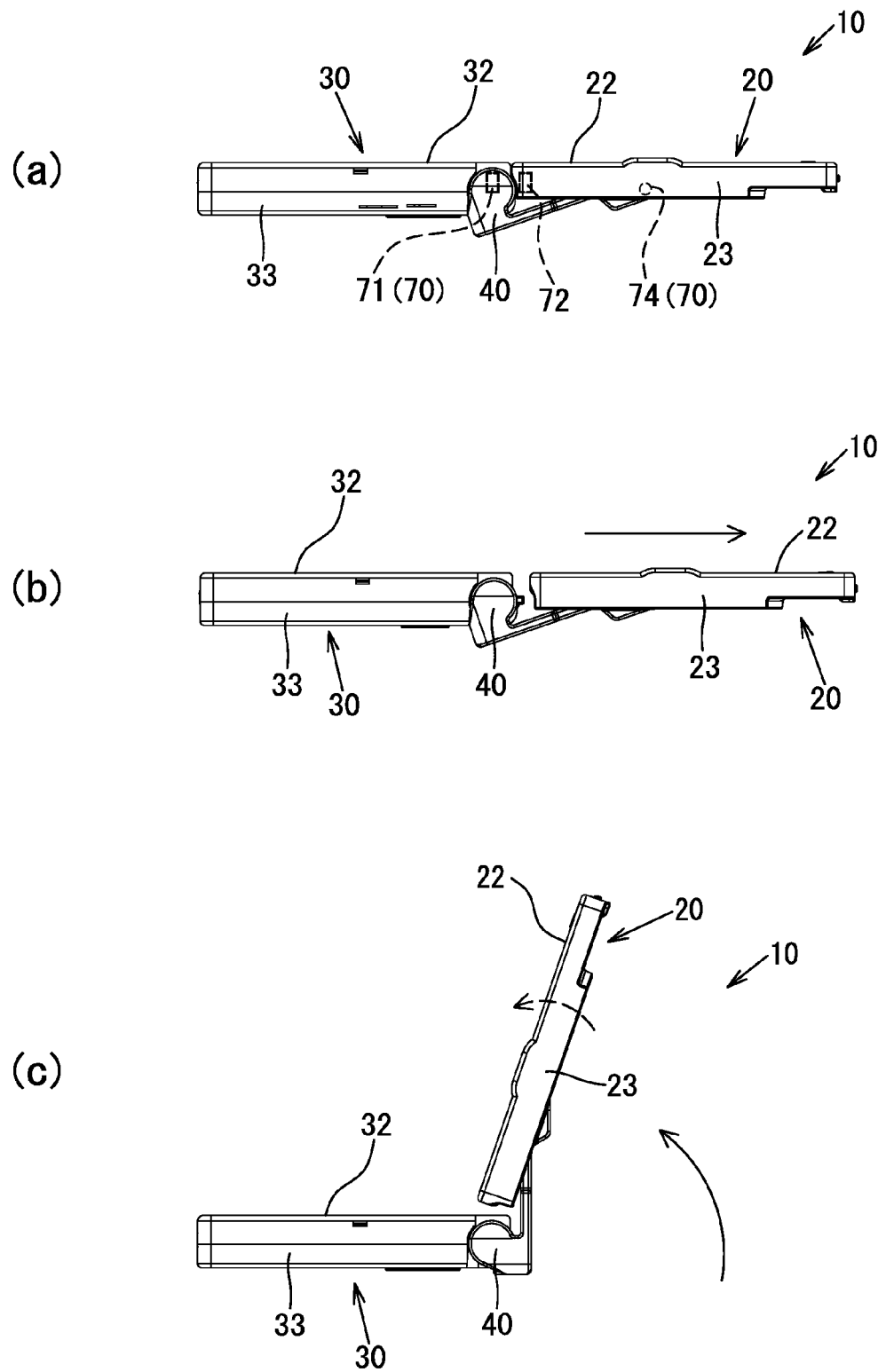
FIGS. 5(a) to 5(c) are side views of the electronic device showing a process from the state in FIG. 1 to the state in FIG. 3, FIG. 5(a) showing the flat approaching state in FIG. 1, FIG. 5(b) showing the flat separate state in FIG. 2, and FIG. 5(c) showing the tilted state in FIG. 3.
Figure 6:
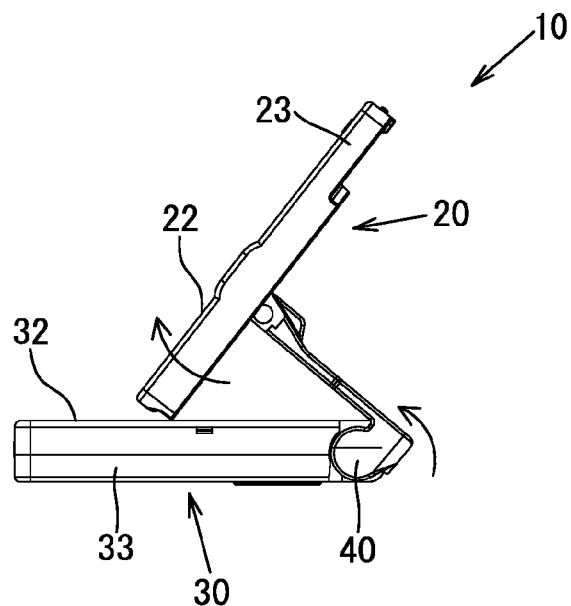
FIGS. 6(a) to 6(c) are side views of the electronic device showing a process to the folded state in FIG. 4 after the tilted state in FIG. 3, FIG. 6(a) showing a state where the first display screen is tilted so as to be slid forward with respect to the second display screen, FIG. 6(b) showing a state where the first display screen is further tilted so as to be slid from the state in FIG. 6(a), and FIG. 6(c) showing the folded state in FIG. 4.
Figure 6:
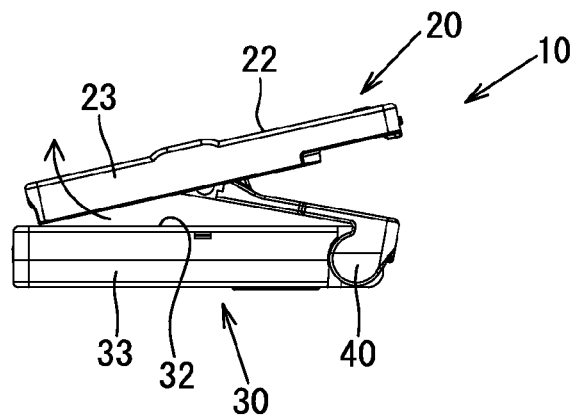
Figure 6:
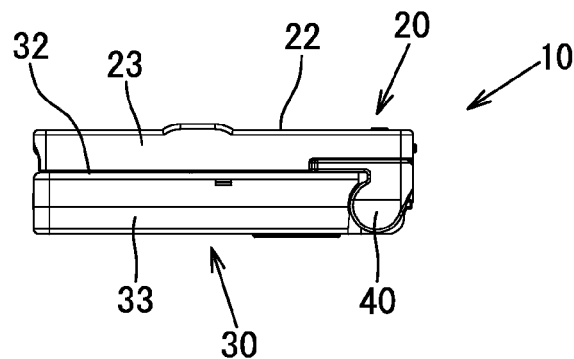

In FIGS. 1 to 6, a state is shown where the second display part 30 is arranged horizontally so that the second display screen 31 faces upward, and in any of figures, a direction toward which the second display part 30 faces is referred to as "upper" and a back side thereof is referred to as "lower", in FIGS. 1 to 4, a left front side in the figures is referred to as "front", and a right rear side is referred to as "rear", and in FIGS. 5 to 6, a left side in the figures is referred to as "front" and a right side is referred to as "rear". "Right" and "left" means right and left directions when seen from the "front" direction, respectively. Moreover, as to the first display part 20 and the second display part 30, a front end portion shown in FIG. 1 is referred to as a "base end", and a rear end portion is referred to as a "rear end".

As shown in the respective figures, the first display part 20 and the second display part 30 are housed in housings 23, 33 each having one surface, that is, an upper surface thereof in FIG. 1 opened, so that the display screens 21, 31 capable of displaying the information are visible from the opening side. As the display screens 21, 31, liquid crystal displays can be exemplified, and the display screens 21, 31 are electrically connected to control module 60 (refer to FIG. 7) described later to be able to display various types of information. In FIG. 1, the display part located on the rear side is referred to as the first display part 20, and the display part located on the front side is referred to as the second display part 30.

On the opening sides of the display screens 21, 31, the touch panels 22, 32 that can be operated by the user touching the same with a finger or the like are provided. The touch panels 22, 32 are disposed so as to close the openings of the housings 23, 33, and are formed transparently so that the display screens 21, 31 are visible. As the touch panels 22, 32, an electrostatic capacitance type and a resistance film type can be exemplified.

The touch panels 22, 32 are electrically connected to the control module 60 (refer to FIG. 7) through touch panel control modules 25, 35, and by the user touching the touch panels 22, 32 with a finger or the like to operate the same, corresponding coordinate information is inputted to the control module 60 through the touch panel control modules 25, 35 to be used for various types of operations and the like.

As the operation of the user using the touch panels 22, 32, there can be exemplified tap and double tap in which the user touches the touch panels 22, 32 relatively quickly, and drag, flick, pinch, and long touch (the above-described "long-push operation") in which the time during which the user touches the touch panels 22, 32 is longer than the foregoing.

Moreover, in each of the housings 23, 33, a plurality of operation buttons 50, 50 can be arranged in circumferential surfaces of the touch panels 22, 32 and the housings 23, 33. As the operation buttons 50, 50, a power button or the like can be exemplified. These operation buttons 50, 50 are also electrically connected to the control module 60 (refer to FIG. 7), so that operations of the operation buttons 50, 50 enable various types of control.

The first display part 20 and the second display part 30 are relatively movable by the joining part 40, and in the electronic device 10 of the present embodiment, as shown in FIGS. 1 to 6, the first display part 20 is slidable and turnable with respect to the second display part 30.

As shown in FIGS. 1 to 6, the joining part 40 joins a substantially center in a front-rear direction on the back side of the first housing 23, and a terminal of the second housing 33. The joining part 40 can be made by a plurality of arms and the like, and while detailed description thereof is omitted, as described later, the first display part 20 is slidable and turnable in approaching and separating directions with respect to the second display part 30.

The joining part 40 can be configured so that the first display part 20 and the second display part 30 can be joined only slidably or only turnably.

Relative positions of the first display part 20 and the second display part 30 can be sensed by a movement sensing sensor 70.

As the movement sensing sensor 70, there can be exemplified a contact type switch that senses approach and separation of the first display part 20 and the second display part 30, a non-contact type sensor made up of a magnet 72 and a magnet sensor 71, a potentiometer that senses relative angular variation between the first display part 20 and the second display part 30, or between both the display parts 20, 30 and the joining part 40, and the like.

Figure 7:
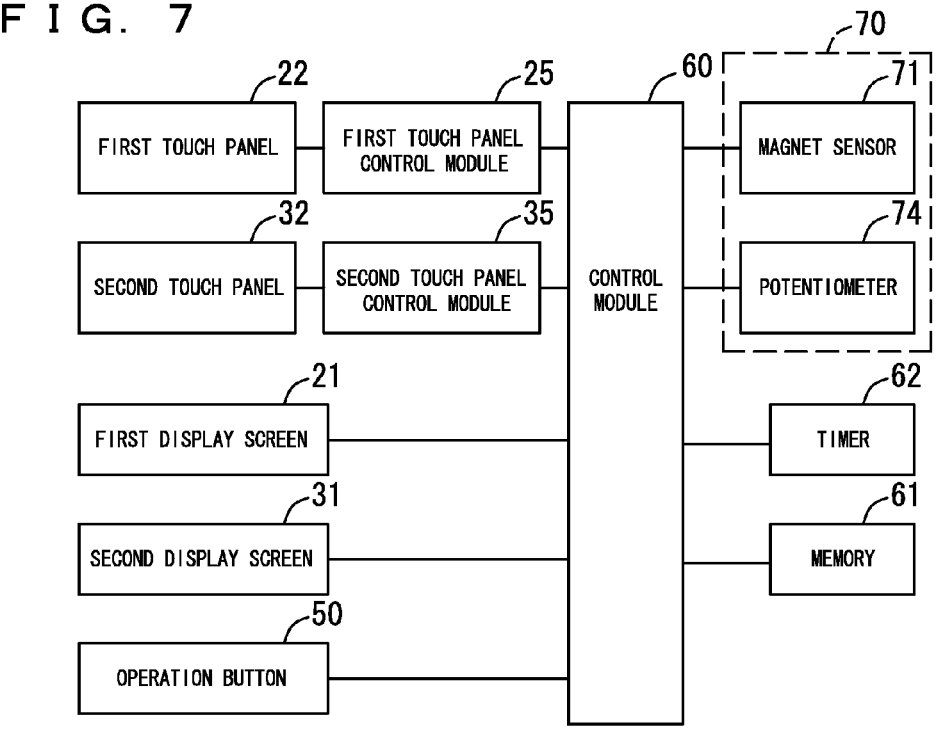
FIG. 7 is a block diagram of the electronic device of the present embodiment.

The movement sensing sensor 70 is also electrically connected to the control module 60 (refer to FIG. 7).

As the movement sensing sensor 70, in the present embodiment, as shown in FIGS. 1 and 5(a), the magnet 72 is buried in a base end of the first display part 20, and the magnet sensor 71 is housed in the terminal of the second display part 30, which approaches the magnet 72 in a flat approaching state, so that the approach/separation of the first display part 20 and the second display part 30 can be sensed. Thereby, whether the electronic device 10 is in the state shown in FIGS. 1 and 5(a) or in a state other than this can be sensed.

Moreover, as shown in FIG. 5(a), the potentiometer 74 is disposed in a joining portion between the joining part 40 and the first display part 20, so that it is sensed that the first display part 20 rotates around the joining part 40.

FIG. 7 shows one example of a block diagram of the electronic device of the present invention.

Control of the electronic device is wholly performed by the control module 60 made of a CPU or the like, as shown in FIG. 7.

The aforementioned first display screen 21 and second display screen 31 are electrically connected to the control module 60, and the information can be displayed.

The first touch panel 22 and the second touch panel 32 are electrically connected to the control module 60 through the first touch panel control module 25 and the second touch panel control module 35, respectively. The input of the user from the first touch panel 22 and the second touch panel 32 is transmitted to the control module 60 through the touch panel control modules 25, 35, and the control module 60 performs an editing operation or the like to the information of the display screens 21, 31 in accordance with the input.

To the control module 60 are electrically connected a memory 61 storing various types of motions of the electronic device 10, various types of data desired by the user and the like, a timer 62 and the like as well as the above operation buttons 50, 50.

The first display part 20 and the second display part 30 connected by the above-described joining part 40 are relatively movable, as follows.

For example, FIG. 1 shows a state where in the first display part 20 and the second display part 30, the first display screen 21 and the second display screen 31 are substantially coplanar, and the base end of the first housing 23 and the terminal of the second housing 33 approach each other. A side view of FIG. 1 is shown in FIG. 5(a). This state is referred to as the "flat approaching state".

In the flat approaching state, the first display screen 21 and the second display screen 31 are continued, so that they can be viewed as one screen, and the first touch panel 22 and the second touch panel 32 can also be operated as one continuous touch panel.

The flat approaching state of the display parts 20, 30 can be sensed by the above magnet sensor 71, and can be transmitted to the control module 60.

Figure 2:
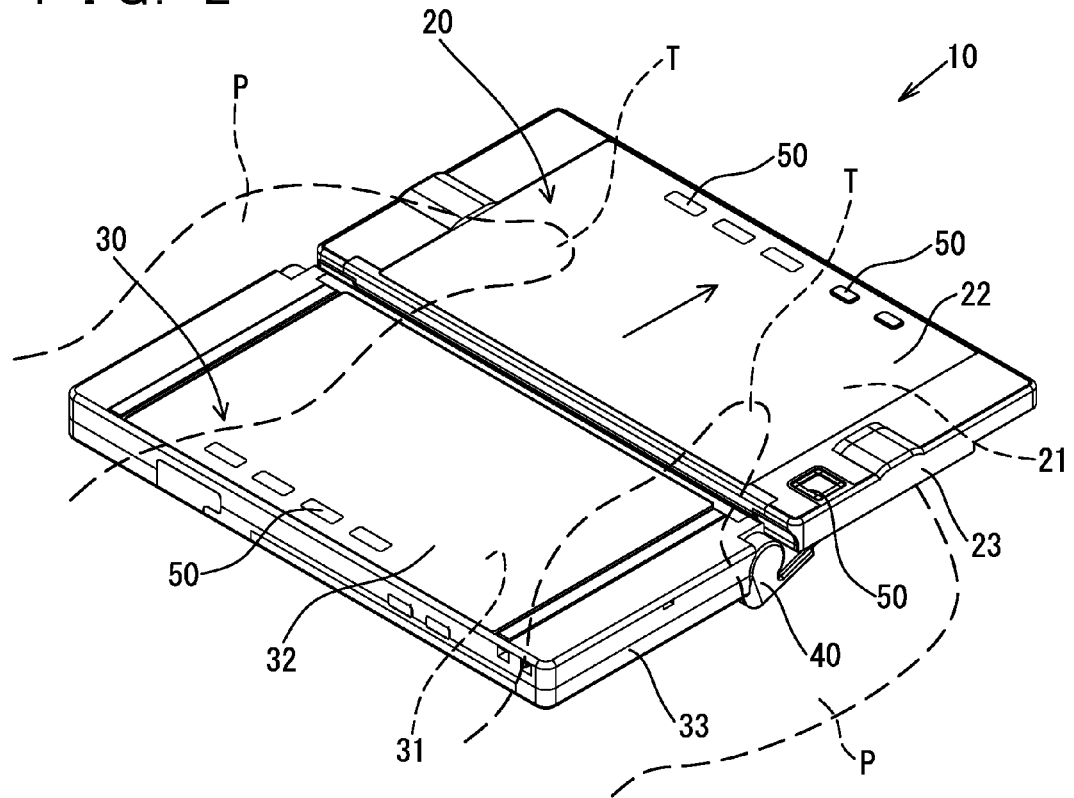
FIG. 2 is a perspective view of the electronic device showing a flat separate state where the display screens are separated from the state of FIG. 1.

When from the above-described flat approaching state, as shown in FIG. 2, the user supports a back surface of the second housing 33 with four fingers of a hand P, and pushes the first touch panel 22 rearward with both thumbs T while supporting the second touch panel 32 with thenar eminences, the first display part 20 slides in a direction separating from the second display part 30. This state is referred to as a "flat separate state", and a side view thereof is shown in FIG. 5(b).

The shift from the flat approaching state to the flat separate state can be sensed by the magnet sensor 71 to be transmitted to the control module 60.

When from the flat separate state in FIG. 2, a terminal side of the first display part 20 is grasped to raise the first display part 20 so that the first display screen 21 is tilted forward, the first display screen 21 can be tilted with respect to the second display screen 31, as shown in FIGS. 3 and 5(c). This state is referred to as a "tilted state". This motion can be performed by grasping the first display part 20 with a thumb, a forefinger or the like of one hand to raise the same, while holding the second housing 33 with the other hand.

As described above, the turning of the first display part 20 can be sensed by the potentiometer 74 to be transmitted to the control module 60.

In the tilted state, since the first display screen 21 is tilted while maintaining the second display screen 31 horizontally, the first display screen 21 is easily viewed, and for example, the information such as characters is displayed on the first display screen 21, and a keyboard or the like is displayed on the second display screen 31, so that the operation of the second touch panel 32 can result in the electronic device 10 excellent in operability.

From the tilted state, as shown in FIG. 6(a), the first display part 20 is pushed down rearward around the joining portion with the joining part 40, and further, as shown in FIG. 6(b), the first display part 20 is pushed downward so that a terminal of the first display part 20 approaches the terminal of the second display part 30, by which as shown in FIGS. 4 and 6(c), a folded state where the first display part 20 and the second display part 30 overlap each other with the first display part 20 on the upper side can be obtained.

As described above, the turning of the first display part 20 can be sensed by the potentiometer 74 to be transmitted to the control module 60.

In the folded state, only the first display part 20 can be viewed, and only the first touch panel 22 and the operation buttons 50, 50 exposed on a surface thereof can be operated, while the second display part 30 cannot be viewed, and the operation of the second touch panel 32 cannot be performed, either.

This folded state is preferable for a use state where the information is displayed only on the first display screen 21, and only the first touch panel 22 and the operation buttons 50, 50 exposed on the surface are operated, and is preferable for a non-use state and carrying of the device, because the electronic device 10 can be made compact.

In order to shift from the folded state to the tilted state and the flat approaching state, a reverse motion to the foregoing only needs to be performed.

In an general operation, the control module 60 can switch the information displayed on the first display screen 21 and the second display screen 31, based on the display of the information to the first display screen 21 and the second display screen 31, various types of control on the basis of the input from the first touch panel 22, the second touch panel 32 and the operation buttons 50, 50, and the movement sensing sensor 70.

In the shift from the flat approaching state to the flat separate state or the reverse shift, in the shift from the flat separate state to the tilted state, and in the shift from the tilted state to the folded state or the reverse shift, since the thumbs, the thenar eminences and the like touch the touch panels 22, 32 as described above, the touch panels 22, 32 may recognize this as input, thereby causing an erroneous operation, malfunction or the like.

In the above-described motion, time during which the user touches the touch panels 22, 32 is recognized by the touch panel control modules 25, 35 as the long-push operation longer than tap or double tap, that is, the operation such as drag, flick, pinch, and long touch, which is transmitted to the control module 60.

Consequently, in the present invention, when in a state where the long-push operation is performed, the movement sensing sensor 70 senses relative movement between the first display part 20 and the second display part 30, the input to the touch panels 22, 32 by the user is determined to be undesired input by the user, which is performed to move the first display part 20 relatively to the second display part 30, and a signal inputted from each of the touch panel control modules 25, 35 to the control module 60 by the operation is invalidated.

Moreover, while the movement sensing sensor 70 senses the relative movement of the first display part 20 and the second display part 30, if the user touches the touch panels 22, 32, the signal from the each of the touch panel control modules 25, 35 to the control module 60 is also desirably invalidated.

Figure 8:
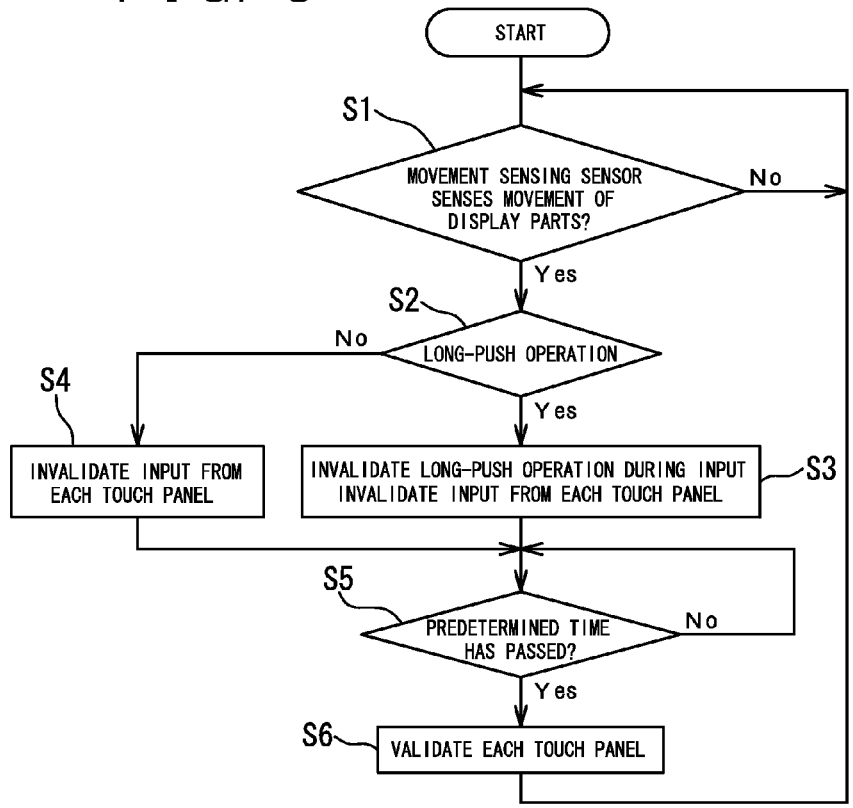
FIG. 8 is a flowchart diagram showing one example of motions.

As a specific embodiment, as shown in a flowchart of FIG. 8, if the movement sensing sensor 70 senses the relative movement between the first display part 20 and the second display part 30 (Yes in Step 1), the control module 60 determines whether or not the first touch panel 22 and/or the second touch panel 32 are (is) in the state where the long-push operation is performed, based on the signal of each of the touch panel control modules 25, 35 (step 2). At this time, if they are in the state where the long-push operation is performed (Yes in step 2), the inputted long-push operation is invalidated, and the input itself of the signal inputted through each of the touch panel control modules 25, 35 from each of the touch panels 22, 32 during that time is invalidated (step 3).

Since this can invalidate the operation when the user touches the touch panels 22, 32 in order to perform the slide or opening/closing of the display parts 20, 30, the erroneous operation, malfunction or the like undesired by the user can be prevented.

When the movement sensing sensor 70 senses the relative movement between the first display part 20 and the second display part 30 (Yes in step 1), if the long-push operation is not performed (No in step 2), the signal inputted from each of the touch panels 22, 32 through each of the touch panel control modules 25, 35 is invalidated (step 4).

When it is detected by the timer 62 provided in the control module 60 that a predetermined time (e.g., 2 seconds) has passed (step 5) after the touch panels 22, 32 are invalidated (step 3 and step 4), the touch panels 22, 32 are again validated (step 6), by which the electronic device 10 can be operated in the display parts 20, 30 in positional relations desired by the user. The count time of the timer 62 is not limited to the foregoing.

Moreover, only while the movement sensing sensor 70 is sensing the relative movement of the display parts 20, 30, the input of the long-push operation and the operation to the touch panels 22, 32 may be invalidated.

According to the foregoing, since the input of the signal from each of the touch panels 22, 32 when the first display part 20 and the second display part 30 are relatively moved by the slide and the opening/closing in the state where the user grasps or touches the touch panels 22, 32 can be invalidated, an erroneous operation, malfunction or the like can be reduced as much as possible.

While in the above embodiment, the long-push operation in the relative slide or turning between the display parts 20, 30 is invalidated, an acceleration sensor that senses an acceleration in a direction of gravitational force may be equipped in the display parts 20, 30, so that an erroneous operation, malfunction or the like caused when an orientation of the electronic device 10 is changed from a lateral direction to a longitudinal direction in a state where the user grasps the touch panels 22, 32 may be prevented.

The present embodiment is useful as the electronic device that does not cause an erroneous operation, malfunction or the like when the display parts are relatively moved.

DESCRIPTION OF REFERENCE CHARACTERS

10 electronic device
20 first display part
21 first display screen
22 first touch panel
30 second display part
31 second display screen
32 second touch panel
40 joining part
60 control module
70 movement sensing sensor
71 magnet sensor
72 magnet
74 potentiometer

The invention claimed is:

1. An electronic device comprising:
 a plurality of display screens configured to display information;
 a joining part configured to join the plurality of display screens such that at least one of the plurality of display screens moves relative to another;
 a touch panel provided on at least one of the plurality of display screens, and configured to be operated by a user;
 a touch panel control module electrically connected to the touch panel, and configured to receive a signal from the touch panel;
 a movement sensor configured to sense relative movement between the display screens; and
 a control module electrically connected to the touch panel control module and the movement sensor,
 wherein the control module is configured to
  receive a signal from the touch panel control module, and,
  when the movement sensor senses relative movement between the display screens,
 invalidate the signal from the touch panel control module until a predetermined time has passed, and validate the signal from the touch panel control module once the predetermined time has passed.

2. The electronic device according to claim 1, wherein the control module invalidates the signal, when the relative movement between the display screens is sensed by the movement sensor while the touch panel control module is receiving the signal from the touch panel.

3. The electronic device according to claim 1, wherein when the control module validates the signal from the touch panel control module, if the signal is continuously inputted to the touch panel control module before the relative movement of the display screens is sensed by the movement sensing sensor, the continuously-inputted signal is validated.

4. The electronic device according to claim 1, wherein the joining part joins the plurality of display screens such that at least one of the plurality of display screens turns relative to another, and the movement sensor senses relative turning between the display screens as the relative movement between the display screens.

5. The electronic device according to claim 1, wherein the joining part is capable of moving the plurality of display screens relatively so that the display screens are located substantially coplanarly, and joining the display screens so that end portions of the display screens approach each other, and the movement sensor senses that the display screens approach and/or separate from each other as the relative movement between the display screens.

6. The electronic device according to claim 1, wherein the joining part joins the plurality of display screens such that the at least one of the plurality of display screens is configured to move from a substantially coplanar position with another one of the plurality of display screens to a folded position with respect to the other one of the plurality of display screens and to turn during movement between the substantially coplanar and folded positions.

7. The electronic device according to claim 6, wherein the movement sensor is configured to sense both movement between the substantially coplanar and folded positions and turning during movement.

8. The electronic device according to claim 7, wherein the movement sensor comprises both a first sensor to sense movement between the substantially coplanar and folded positions, and a second sensor to sensor to detect turning during movement.

9. The electronic device according to claim 8, wherein the first sensor comprises a magnet sensor.

10. The electronic device according to claim 8, wherein the second sensor comprises a potentiometer.

* * * * *